United States Patent [19]

Sumida

[11] Patent Number: 4,739,405
[45] Date of Patent: Apr. 19, 1988

[54] CIRCUIT FOR STORING AN IMAGE SIGNAL IN AN IMAGE MEMORY AND FOR READING THE SIGNAL THEREFROM AT A DIFFERENT RATE FOR DISPLAY ON A DISPLAY UNIT

[75] Inventor: Kazuyuki Sumida, Tokyo, Japan
[73] Assignee: NEC Corporation, Japan
[21] Appl. No.: 687,018
[22] Filed: Dec. 28, 1984
[30] Foreign Application Priority Data
 Jan. 6, 1984 [JP] Japan .................................... 59-1216
[51] Int. Cl.$^4$ .............................................. H04N 5/14
[52] U.S. Cl. .................... 358/160; 358/140; 382/47
[58] Field of Search ................. 358/160, 140, 141, 11, 358/12, 138, 214, 54, 287, 134, 22, 188, 280, 183, 180; 382/47, 56; 340/731

[56] References Cited

U.S. PATENT DOCUMENTS

| | | | |
|---|---|---|---|
| 3,617,626 | 11/1971 | Bluth et al. ............................ | 358/11 |
| 4,153,896 | 5/1979 | White ..................................... | 382/47 |
| 4,275,450 | 6/1981 | Potter ..................................... | 382/47 |
| 4,302,776 | 11/1981 | Taylor et al. ......................... | 358/180 |
| 4,476,493 | 10/1984 | Poetsch et al. ....................... | 358/54 |
| 4,496,974 | 1/1985 | Heitmann ............................. | 358/140 |
| 4,561,024 | 12/1985 | Tamura ................................. | 358/287 |
| 4,675,908 | 6/1987 | Saito et al. ............................ | 382/47 |

FOREIGN PATENT DOCUMENTS

| | | | |
|---|---|---|---|
| 0069319 | 6/1979 | Japan ................................... | 358/134 |
| 2097219 | 10/1982 | United Kingdom ................ | 358/140 |

*Primary Examiner*—James J. Groody
*Assistant Examiner*—David E. Harvey
*Attorney, Agent, or Firm*—Laff, Whitesel, Conte & Saret

[57] ABSTRACT

Predetermined ones of picture elements read from a frame memory at a first clock rate, are stored in an image memory and are read therefrom at a second clock rate for display on a display unit with the first and the second clock rates selected independently of each other. Preferably, a serial signal of the predetermined elements is converted for storage in the image memory into a parallel signal of a predetermined number of bits. The predetermined elements stored in the image memory, are read therefrom as a parallel signal of the predetermined number of bits, the read-out parallel signal being converted to a serial signal for the display.

3 Claims, 2 Drawing Sheets

CIRCUIT FOR STORING AN IMAGE SIGNAL IN AN IMAGE MEMORY AND FOR READING THE SIGNAL THEREFROM AT A DIFFERENT RATE FOR DISPLAY ON A DISPLAY UNIT

BACKGROUND OF THE INVENTION

This invention relates to a circuit for use in displaying a facsimile or a like image signal on a display unit, such as a CRT display.

As will later be described in detail, a frame factory is used on displaying an image signal on a display unit. The frame memory is for storing picture elements of the image signal. The picture elements are read from the frame memory for display on the display unit at a display clock rate of the display unit. It is usual on displaying the image signal to extract predetermined elements of the picture elements read from the frame memory. When the predetermined elements are, for example, 4/25 in number of the picture elements and should be displayed at the display clock rate of 20 MHz, the frame memory must be read at as high a reading rate as 125 MHz. This high reading rate is impractical. Furthermore, the frame memory is in use throughout during display of the image signal.

SUMMARY OF THE INVENTION

It is therefore an object of the present invention to provide a circuit which is practically opposite on displaying an image signal on a display circuit.

It is another object of this invention to provide a circuit of the type described, in which a frame memory is rendered no more busy during display of the image signal.

In keeping with an aspect of the invention, a circuit controls a display unit in order to display an original text as a displayed text. The display is controlled by a display clock seqquence driven by clock pulses which recur at a display clock rate. An original text is scanned to produce an image signal which includes a number of picture element signals that represent picture elements of the original text. A frame memory stores the picture element signals. A read clock sequence is driven by clock pulses that recur at a read clock rate, which is independent of the display clock rate. Responsive to the read clock sequence, a frame memory timer times the signal elements stored in the frame memory, and predetermined elements are extracted from the timed signal elements. These predetermined elements are specified by a predetermined subsampling ratio which is taken relative to the output signal elements. The read clock rate is independent of the predetermined subsampling ratio. The predetermined elements are stored in the image memory, which is read in response to the display clock sequence, at the display clock rate. The display elements are supplied to the display unit for displaying a displayed text.

DESCRIPTION OF THE PREFERRED EMBODIMENT

Figure 1:
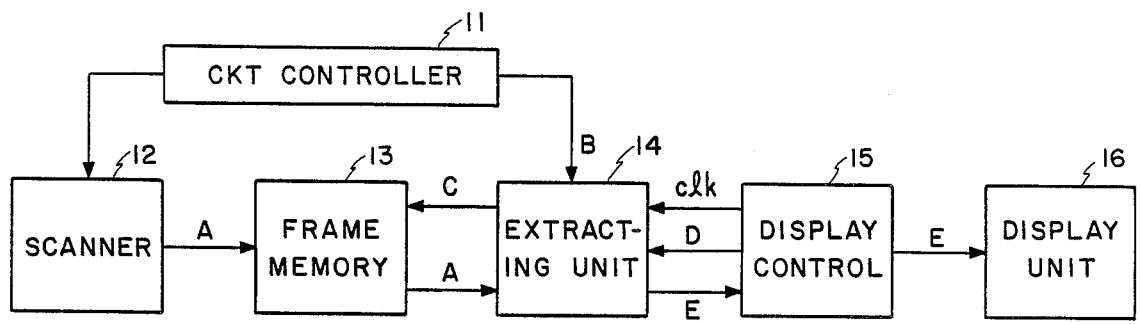
FIG. 1 is a block diagram of a circuit for use in displaying an image signal on a display unit.

Referring to FIG. 1, a circuit will be described at first in order to facilitate an understanding of the instant invention. The circuit is what would be devised on implementing a circuit for use in displaying an image signal on a display unit.

The circuit comprises a circuit controller 11 for producing various control signals in the manner which will presently become clear. Supplied from the circuit controller 11 with a main and an auxilliary scan control signal indicative of main and auxiliary scans, a scanner 12 scans an original text in FIG. 2(a) and produces an image signal A which comprises picture element signals representative of picture elements the text and are arranged along the main and the auxiliary scans. The image signal A may either be a binary signal or a multilevel signal. For simplicity of description, the picture element signals are herein simply called "picture elements". The picture elements along each main scan are called a "line signal". The picture elements are stored in a frame memory 13.

When a command B is sent from the circuit controller 11 to an extracting unit 14, the extracting unit 14 delivers a reading signal C to the frame memory 13. Responsive to the reading signal C, the frame memory 13 delivers the picture elements of the image signal A as a serial signal to the extracting unit 14. Typically, the number of picture elements is 100 kilobytes for a text when the image signal A is a binary signal.

The command B may indicate a rate of extraction or subsampling of predetermined elements from the picture elements delivered to the extracting unit 14. By way of example, the command B indicates extraction, as the predetermined elements, of second and fourth picture elements among each set of five picture elements along second and fourth main scans amonng each set of five main scans. Responsive to such a command B, the extracting unit 14 selects the predetermined elements.

A display controller 15 is for a display unit 16 which is typically a CRT display. Supplied with a display clock sequence clk and a synchronizing signal D from the display controller 15, the extracting unit 14 delivers the predetermined elements to the display unit 16 for display thereon as indicated at E. The display clock sequence clk has a clock rate which is predetermined for the display unit 16. The rate of extraction is usually decided so that the text may be displayed on the display unit 16.

Recent display units are capable of displaying images with a high resolution in order that the images may be displayed with a high quality. The clock rate is accordingly high, such as 20 MHz. For the numerical example wherein the rate of extraction is 4/25, the picture elements must be read from the frame memory 13 at as high a reading rate as 125 MHz. This high reading rate is impractical. Moreover, the frame memory 13 is in use all the way during display of the text.

Figure 2A:
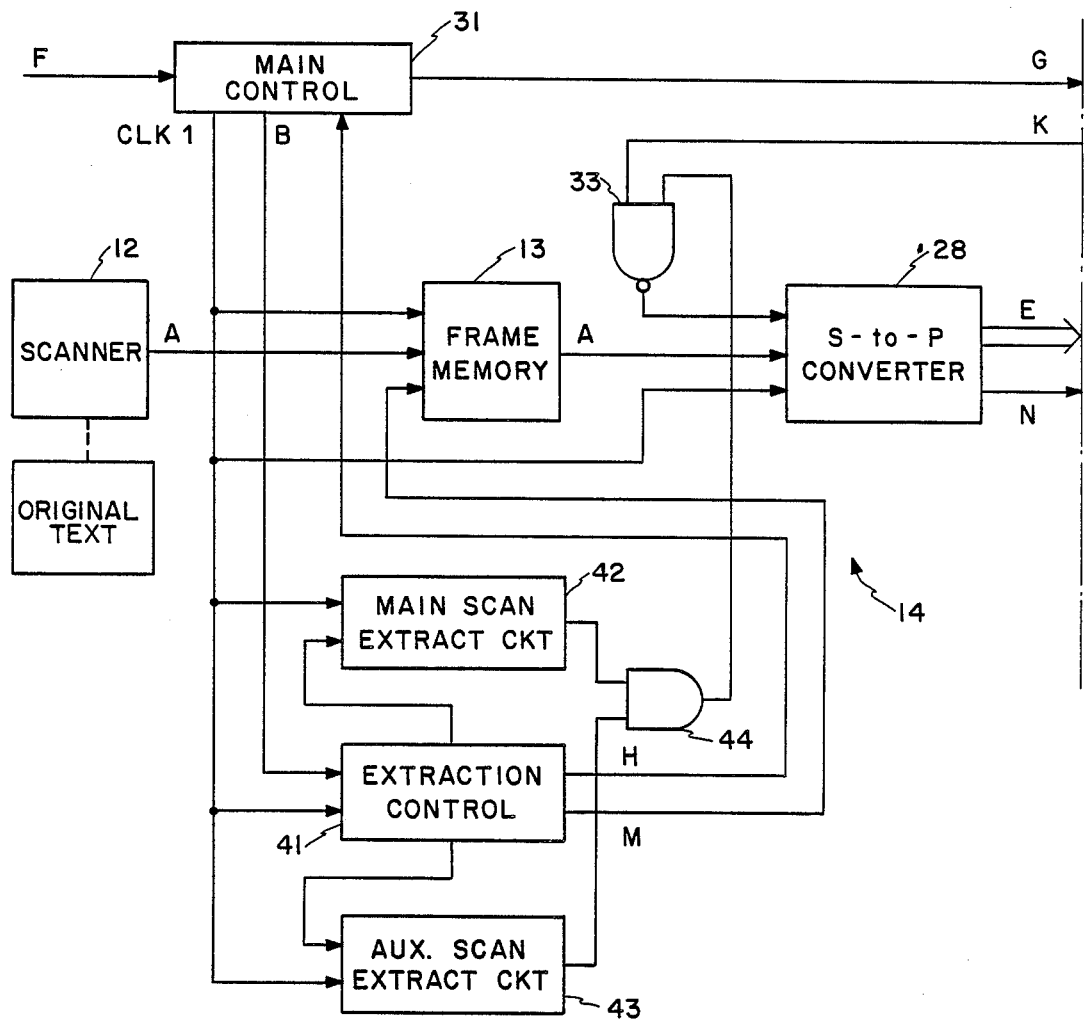
FIGS. 2(a) and 2(b) collectively show in blocks a circuit according to an embodiment of this invention.
Figure 2B:
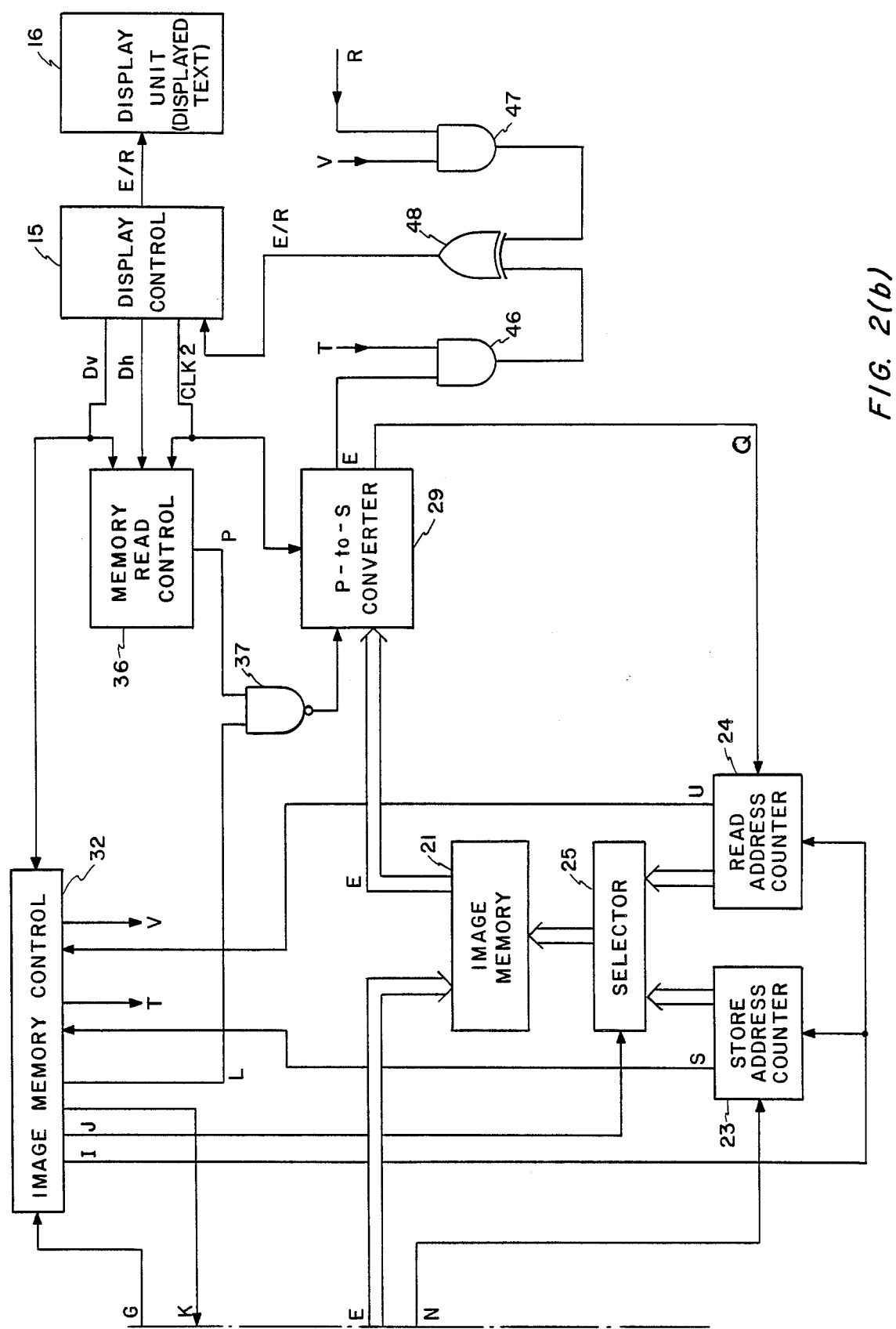

Referring now to FIGS. 2(a) and (b), a circuit according to an embodiment of this invention comprises similar parts designated by like reference numerals and is operable with similar signals which are indicated by like reference letters. In the manner described in conjunction with FIG. 1, the frame memory 13 stores picture elements of an image signal A as stored signal elements.

In the manner which will become clear as the description proceeds, an image memory 21 has a prescribed number of addresses for storing, as stored image elements, predetermined elements E which are extracted from the picture elements read from the frame memory 13. A store address counter 23 is for generating a store address signal indicative of the image memory addresses for storage of the predetermined elements E. A read address counter 24 is for generating a read address signal indicative of the image memory addresses for reading of the stored elements. A selector 25 is for selectively supplying the store and the read address signals to the image memory 21. The predetermined elements E are stored in the image memory 21 through a series-to-parallel converter 28. The stored image elements are read from the image memory 21 through a parallel-to-series converter 29.

The circuit controller 11 described in connection with FIG. 1, is depicted as a main controller 31. Responsive to an image signal display request signal F produced by a keyboard or a like manually or automatically operable device (not shown), the main controller 31 delivers a first sequence CLK1 of clock pulses of a first clock rate to the frame memory 13, to the extracting unit 14, and to the series-to-parallel converter 28 and the command B of the type described in conjunction with FIG. 1 to the extracting unit 14. The main controller 31 furthermore supplies an image memory controller 32 with a mode signal G indicative of modes of operation of the image memory 21.

A display request signal producing arrangement is indicated by a connection drawn to the main controller 31 and labelled F (FIG. 2a). Herein, the first clock sequence CLK1 is alternatively referred to as a read clock sequence with the first clock rate being called a "read clock rate". A clock generator for generating the read clock sequence CLK1 is therefore indicated by that part of the main controller 31 from which a connection is drawn with a label CLK1. The read clock sequence CLK1 is used in reading out the stored signal elements, from the frame memory 13, as output signal elements.

At first, the mode signal G indicates a store mode of storing the predetermined elements E in the image memory 21. Upon completion of extraction of the predetermined elements E from the picture elements read from the frame memory 13, the extracting unit 14 sends an end of extraction signal H back to the main controller 31 in the manner which will later be described more in detail. REsponsive to the end of extraction signal H, the main controller 31 makes the mode signal G indicate a read mode of reading the stored image elements from the image memory 21. The main controller 31 and the memory controller 32 which is operable in the manner described in the following, will readily be implemented by one skilled in the art.

Responsive to the mode signal G indicative of the store mode, the memory controller 32 delivers a clear signal I to the store and the read address counters 23 and 24, a selection signal J to the selector 25 to make the same select the store address signal, and a store request signal K to a store NAND gate 33.

The display controller 15 supplies the parallel-to-series converter 29 with a second sequence CLK2 of clock pulses of a second clock rate and an image memory read controller 36 with the second clock sequence CLK2, a vertical synchronizing signal Dv, and a horizontal synchronizing signal Dh. The second clock sequence CLK2 is what was called the display clock sequence clk in conjunction with FIG. 1. Therefore the second clock rate is alternatively called a "display clock rate". It should be noted that the display clock rate is very high, as described earlier. A combination of the vertical and the horizontal synchronizing signals Dv and Dh was simply named the synchronizing signal D and serves to carry out vertical and horizontal scans of a raster on the display unit 16. The vertical synchronizing signal Dv is delivered also to the memory controller 32, which detects a start point of each raster and delivers a read request signal L to a read NAND gate 37.

The second clock rate is typically 20 MHz as described heretobefore. The horizontal synchronizing signal Dh is a sequence of horizontal synchronizing pulses which are synchronized for the respective horizontal scans with the clock pulses of the second sequence CLK2.

Referring more particularly to FIGS. 2(a) and (b), the extracting unit 14 comprises an extraction controller 41 responsive to the command B for delivering a frame memory read request signal M to the frame memory 13. Responsive to the first clock sequence CLK1 and the command B, the extraction controller 41 sends a sequence of dot pulses to a main scan extracting circuit 42 and a sequence of line pulses to an auxiliary scan extracting circuit 43 in the manner which will shortly be exemplified. When the frame memory read request signal M is produced, the frame memory 13 delivers the picture elements of the image signal A as a serial signal to the series-to-parallel converter 28 in synchronism with build ups of the first clock sequence CLK1. In this manner, the picture elements are read from the frame memory 13 in effect at the first clock rate.

It will now be assumed that the command B merely indicates start of operation of the extraction controller 41 and that the rate of extraction is manually or otherwise set on the main and the auxiliary scan extracting circuits 42 and 43. In addition to the numerical example described for the rate of extraction in connection with FIG. 1, it will be presumed that each main scan of the text is divided into 3,456 picture elements. In this manner, each line signal comprises a preselected number of picture elements. The extraction controller 41 produces the line pulses, one for each set of 3,456 dot pulses.

Supplied with the first clock sequence CLK1, the main scan extracting circuit 42 produces a main scan extracting signal consisting of second and fourth ones of the dot pulses among each set of five dot pulses. Likewise supplied with the first clock sequence CLK1, the auxiliary scan extracting circuit 43 produces those 3,456 clock pulses as an auxiliary scan extracting signal which successively follow each of second and fourth ones of the line pulses among each set of five line pulses. Responsive to the main and the auxiliary scan extracting signals, an extraction AND gate 44 delivers an extracted sequence to the store NAND gate 33 which is already supplied with the store request signal K. The store NAND gate 33 delivers the extracted sequence to the series-to-parallel converter 28.

In this manner, the main scan extracting circuit 42 produces the main scan extracting signal which consists of a first preselected number of dot pulses, such as two dot pulses, among each set of a second preselected number of dot pulses, such as a set of five dot pulses. The auxiliary scan extracting circuit 43 produces the auxiliary scan extracting signal which consists of a third preselected number of line pulses, such as two line pulses, among each set of a fourth preselected number of line pulses, such as a set of five line pulses. The predetermined rate of extraction should be equal to a ratio of a product of the first and the second preselected numbers to another product of the third and the fourth preselected numbers.

Supplied with the picture elements of the image signal A and controlled by the first clock sequence CLK1 and the extracted sequence, the series-to-parallel converter 28 extracts or selects the predetermined elements E and delivers them to the image memory 21 with the serial signal converted to a parallel signal. Each parallel datum of the parallel signal is a set of a predetermined number, such as eight, of the predetermined elements E. In the meantime, the series-to-parallel converter 28 delivers a store address renewing signal N to the store address counter 23 after each parallel datum to renew the image memory address indicated by the store address signal. Although not illustrated in detail, the series-to-parallel converter 28 may comprise a shift register for the serial signal of the predetermined elements E. A counter for the predetermined elements E may produce a carry signal which provides the store address renewing signal N. In practice, the counter may be controlled by the extracted sequence and count the clock pulses of the first sequence CLK1 in producing the carry signal.

It is now understood that either the command B or a combination of the main and the auxiliary scan extracting circuits 42 and 43 specifies the predetermined elements E which should be extracted from the picture elements read from the frame memory 13 and that another combination of the main and the auxiliary scan extracting circuits 42 and 43 and the extraction AND gate 44 selects those predetermined pulses of the first sequence clock pulses as the extracted sequence which correspond to the predetermined elements E.

Controlled by the extracted sequence through the read NAND gate 33, the series-to-parallel converter 28 serves as that part of the extracting unit 14 which is responsive to the extracted sequence for selecting the predetermined elements E from the picture elements read from the frame memory 13. It is convenient in this connection to understand that that part of the main controller 31 which generates the first clock sequence CLK1, is included in the extracting unit 14.

When the number of picture elements is 100 kilobytes as described hereinabove, the extracting unit 14 produces the end of extraction signal H as soon as the extraction controller 41 counts the first sequence clock pulses up to 100 kilobytes. When the rate of extraction is 4/25 as before, the image memory 21 has a memory capacity of at least 16 kilobytes.

When the mode signal G is made to indicate the read mode, the image memory controller 32 switches the selection signal J to make the selector 25 select the read address signal. Moreover, the memory controller 32 detects the start point of a raster as described above to deliver the read request signal L to the read NAND gate 37. On the other hand, the image memory read controller 36 is enabled by the vertical synchronizing signal Dv to count the pulses of the horizontal synchronizing signal Dh to produce a read enable signal P in synchronism with the second clock sequence CLK2 as soon as the horizontal synchronizing pulses are counted to a predetermined count which defines a top line of a display area for use in displaying the text on the display unit 16. The read enable signal P consists of rectangular pulses, each of which defines a horizontal scan on the display area. Responsive to the read request signal L and the read enable signal P, the read NAND gate 37 enables the parallel-to-series converter 29.

The parallel-to-series converter 29 counts the second sequence clock pulses supplied thereto and delivers a read address renewing signal Q to the read address counter 24 each time when the second sequence clock pulses are counted to the predetermined number. Accessed by the read address signal which is successively renewed, the image memory 21 supplies the parallel-to-series converter 29 with the stored elements as a parallel signal indicated again at E. Each datum of the parallel signal E is a set of the predetermined number of the stored elements read from the image memory 21. Controlled by the second clock sequence CLK2 and by the read NAND gate 37, the parallel-to-series converter 29 converts the parallel signal E to a serial signal which is indicated at E once again. The serial signal E is delivered towards the display controller 15 as display elements for display on the display unit 16 as a displayed text.

It is now understood that the parallel-to-series converter 29 serves as a reading unit responsive to the predetermined number of the second sequence clock pulses for reading each parallel datum of the stored elements. It is convenient to understand that that part of the diplay controller 15 is included in the reading unit which generates the second clock sequence CLK2.

Attention should be directed to the fact that the second clock sequence CLK2 controls only read out of the stored elements from the image memory 21 insofar as display of the image signal A on the display unit 16 is concerned. It is possible to read the picture elements of the image signal A from the frame memory 13 and to store the predetermined elements E in the image memory 21 by the first clock sequence CLK1 with the first and the second clock rates selected independently of each other. Furthermore, the selection is the predetermined rate of extraction. The circuit for use in displaying the image signal A on the display unit 16, is therefore practically operable. Furthermore, the frame memory 13 is no more in use once the predetermined elements E are stored in the image memory 21. It is therefore possible to use the frame memory 13 during display of the image signal A for other purposes, such as storage of a like image signal for another text.

In FIGS. 2(a) and (b), the circuit is capable of making the display unit 16 display a character signal R in addition to the image signal A. For this purpose, the circuit includes an image signal display AND gate 46, a character signal display AND gate 47, and an Exclusive OR gate 48 therefor. From the parallel-to-series converter 29, the serial signal E is delivered to the image signal display AND gate 46. The character signal R is fed to the character signal display AND gate 47.

Storage of the predetermined elements E in the image memory 21 comes to an end substantially concurrently with production of the end of extraction signal H by the extracting unit 14. Upon completion of the storage, the store address counter 23 sends an end of storage signal S to the image memory controller 32. For the numerical example being described, the store address counter 23 produces the end of storage signal S when the store address signal is renewed to indicate the image memory address of 16 kilobytes. Responsive to the end of storage signal S, the memory controller 32 delivers an image display enable signal T to the image signal display AND gate 46. Through the Exclusive OR gate 48, the image signal display AND gate 46 sends the serial signal E to the display controller 15.

Read of the stored elements from the image memory 21 eventually comes to an end, when the read address counter 24 sends an end of read signal U to the image memory controller 32. Like the store address counter 23, the read address counter 24 produces the end of read signal U when the image memory address is indicated up to 16 kilobytes. Responsive to the end of read signal U, the memory controller 32 delivers a character display enable signal V to the character signal display AND gate 47. Through the Exclusive OR gate 48, the character signal display AND gate 47 sends the character signal R to the display controller 15 for display on the display unit 16.

For the circuit so far illustrated with reference to FIGS. 2(a) and (b), the image signal display request signal F may be kept on so long as the image signal A should be displayed on the display unit 16. The store request signal K may be turned on in response to indication of the store mode by the mode signal G and be switched off when either the end of extraction signal H or the end of storage signal S is produced. The clear signal I may be produced also when the mode signal G is switched to indicate the read mode. The read request signal L may be turned on in response to indication by the mode signal G of the read mode and be switched off either when the image signal display request signal F is turned off or when the end of storage signal U is produced. It is preferred that one and the other of the image and the character signal display AND gates 46 and 47 be enabled and disabled, respectively, so that the display on the display unit 16 may not be disturbed by either of the image and the character signals A and R.

While this invention has thus far been described in conjunction with a preferred embodiment thereof, it will now readily be possible for one skilled in the art to modify the embodiment in various other manners. For example, unity may be selected as the predetermined number of bits in each set of the predetermined elements E and consequently of the stored elements read from the image memory 21. In this event, the predetermined elements E are delivered to the image memory 21 as a serial signal. The series-to-parallel converter 28 need not carry out the series-to-parallel conversion but should merely produce the store address renewing signal N. This applies to the parallel-to-series converter 29.

What is claimed is:

1. A circuit for displaying an original text on a display unit as a displayed text in response to a display clock sequence of clock pulses of display clock rate, said circuit comprising:
   a scanner for scanning said original text to produce an image signal which comprises picture element signals representative of picture elements of said original text, said image signal further comprising a plurality of line signals, each of said line signals comprising a preselected number of the picture element signals,
   a frame memory for storing said picture element signals as stored signal elements;
   a clock generator for generating a read clock sequence of clock pulses of a read clock rate which is selected independent of said display clock rate;
   frame memory timing means responsive to said read clock sequence for timing said stored signal elements as timed signal elements, said reading being at said read clock rate;
   extracting means responsive to said read clock sequence for extracting predetermined elements from said timed signal elements, said predetermined elements being specified by a predetermined subsampling ratio relative to said timed signal elements, said read clock rate being independent of said predetermined subsampling ratio;
   an image memory;
   storing means for storing said predetermined elements in said image memory as stored image elements;
   image memory reading means responsive to said display clock sequence for reading said stored image elements from said image memory at said display clock rate as display elements;
   supplying means for supplying said display elements to said display unit for display on said display unit as said displayed text
   wherein said extracting means comprises: means responsive to said read clock sequence for producing dot pulses corresponding to the respective picture element signals and line pulses corresponding to the respective line signals;
   means responsive to said dot pulses for producing a main scan extracting signal in the form of a first preselected number of the dot pulses among each set of a second preselected number of the dot pulses;
   means responsive to said line pulses for producing an auxiliary scan extracting signal in the form of a third preselected number of the line pulses among each set of a fourth preselected number of the line pulses, a ratio of a product of said first and said third preselected numbers to another product of said second and said fourth preselected numbers being equal to said predetermined subsampling ratio; and
   means responsive to said main and said auxiliary scan extracting signals for extracting said predetermined elements from said timed signal elements.

2. A circuit as claimed in claim 1, wherein said image memory has a prescribed number of memory addresses, and wherein said storing means comprises:
   means for successively indicating said memory addresses for storage of said predetermined elements in said image memory; and
   means for producing an end of storage signal when all of said prescribed number of memory addresses are indicated.

3. A circuit as claimed in claim 2, wherein said image memory reading means comprises:
   means for producing a display request signal;
   means responsive to said display request signal for producing a read request signal; and
   means responsive to said read request signal and said display clock sequence for successively indicating said memory addresses to read said stored image elements from said image memory as said display elements.

* * * * *